(12) United States Patent
Allen

(10) Patent No.: US 10,189,525 B2
(45) Date of Patent: Jan. 29, 2019

(54) HANDLEBAR ACCESSORY MOUNT

(71) Applicant: Jeffrey M. Allen, Centreville, VA (US)

(72) Inventor: Jeffrey M. Allen, Centreville, VA (US)

(*) Notice: Subject to any disclaimer, the term of this patent is extended or adjusted under 35 U.S.C. 154(b) by 34 days.

(21) Appl. No.: 15/637,825

(22) Filed: Jun. 29, 2017

(65) Prior Publication Data

US 2018/0001950 A1 Jan. 4, 2018

Related U.S. Application Data

(60) Provisional application No. 62/357,417, filed on Jul. 1, 2016.

(51) Int. Cl.
*B62J 9/00* (2006.01)
*B62J 11/00* (2006.01)
*B62J 99/00* (2009.01)

(52) U.S. Cl.
CPC .............. *B62J 9/003* (2013.01); *B62J 11/00* (2013.01); *B62J 99/00* (2013.01); *B62J 2099/0033* (2013.01)

(58) Field of Classification Search
CPC .... B62J 9/003; B62J 99/00; B62J 2099/0033; B62F 11/00
See application file for complete search history.

(56) References Cited

U.S. PATENT DOCUMENTS 5,033,709 A * 7/1991 Yuen ................... B60R 11/0241
224/558
5,179,550 A * 1/1993 Simpson ............ H04B 7/18571
340/10.6

(Continued)

OTHER PUBLICATIONS

"The Best Bike Smartphone Cases & Mounts for Cycling", www.cyclingabout.com, dtd Mar. 12, 2015; pp. 1-16.
(Continued)

*Primary Examiner* — Nathan J Newhouse
*Assistant Examiner* — Lester L Vanterpool
(74) *Attorney, Agent, or Firm* — Bacon & Thomas, PLLC

(57) ABSTRACT

A cam lever operated accessory gripping mechanism the gripping mechanism includes a cam lever, a threaded stud, a dowel fixed to a first end of the threaded stud, first and second relatively movable main body sections, the first of the main body sections including a handlebar bracket extension, a first clamping jaw for engaging a first side of the accessory, and an opening shaped to slidably receive the second main body section, and the second main body section including a bore and a slot for receiving a fastening member into which the threaded stud is threaded, and a second clamping jaw for engaging a second side of the accessory. The dowel is rotatably mounted in the camming lever, which has at least one overcenter camming surface that engages a cam-engaging surface of the first main body section, such that pivoting of the camming lever about the dowel in a first direction causes the dowel holding section of the camming level to move in an axial direction of the threaded stud, pulling the second main body section against a biasing force provided by a biasing spring extending between the first and second main body sections, in a direction that causes the second clamping jaw to move towards the first clamping jaw and thereby grip the accessory. Adjustment of the gripping mechanism to fit different accessories is accomplished by turning the threaded stud to cause axial movement of the follower insert and corresponding movement of the second main body section is a desired direction, to adjust the initial spacing of the first and second clamping jaws.

15 Claims, 11 Drawing Sheets

(56) References Cited

U.S. PATENT DOCUMENTS

| | | | |
|---|---|---|---|
| 5,187,744 A * | 2/1993 | Richter | B60R 11/0241 224/553 |
| 5,788,202 A * | 8/1998 | Richter | B60R 11/0241 224/570 |
| D464,250 S * | 10/2002 | Warner | D8/355 |
| 7,441,981 B2 * | 10/2008 | Crain | G01C 15/00 248/124.1 |
| 7,669,816 B2 * | 3/2010 | Crain | G01C 15/00 248/183.3 |
| 8,490,937 B2 * | 7/2013 | Crain | G01C 15/00 224/929 |
| 8,727,192 B2 * | 5/2014 | Lai | B60R 11/0241 224/282 |
| 8,998,048 B1 * | 4/2015 | Wu | B62J 11/00 224/420 |
| 9,568,148 B2 * | 2/2017 | Carnevali | B60R 11/0241 |
| 2007/0045495 A1 * | 3/2007 | Asano | B60R 11/0241 248/309.1 |
| 2010/0264182 A1 | 10/2010 | Perlman et al. | |

OTHER PUBLICATIONS

"Minoura Product Description", www.universalcycles.com; "downloaded Jun. 22, 2016".

"Minoura Product Description", www.minoura.jp; downloaded Jun. 22, 2016.

"Minoura Product Description", www.amazon.com; downloaded Jun. 22, 2016; pp. 1-5.

"Minoura Phone Grip Smartphone Holder Review", http://road.cc/content/review; downloaded Jun. 22, 2016; pp. 1-6.

"Barfly Product Description", www.barflybike.com/shop; downloaded Jun. 22, 2016; pp. 1-6.

"Delta—Smartphone Caddy II Product Description", http://hostelshoppe.com; downloaded Jun. 22, 2016; pp. 1-2.

* cited by examiner

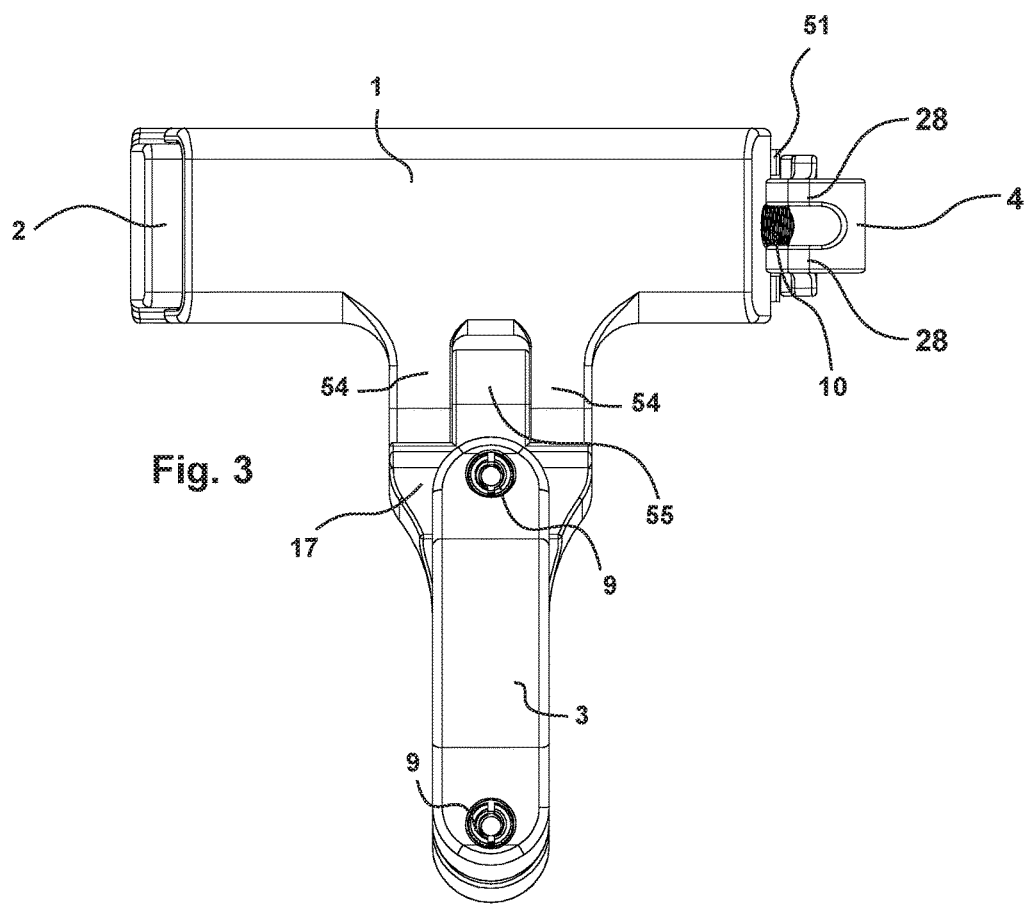

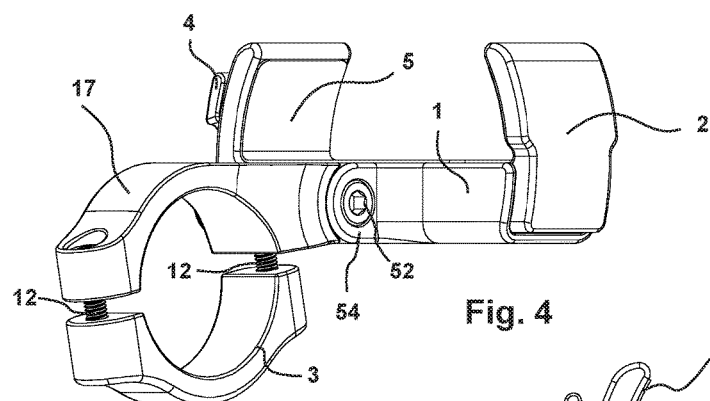
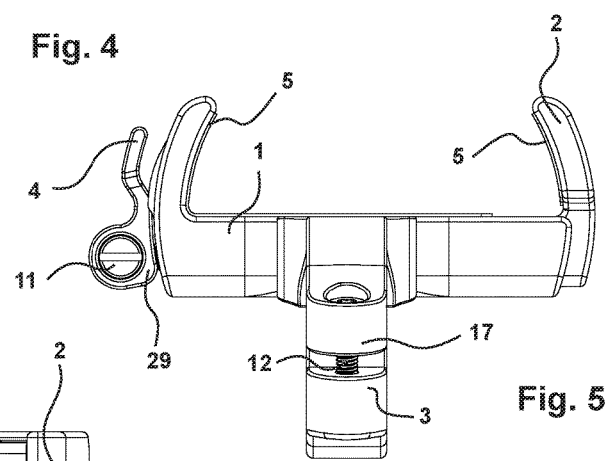
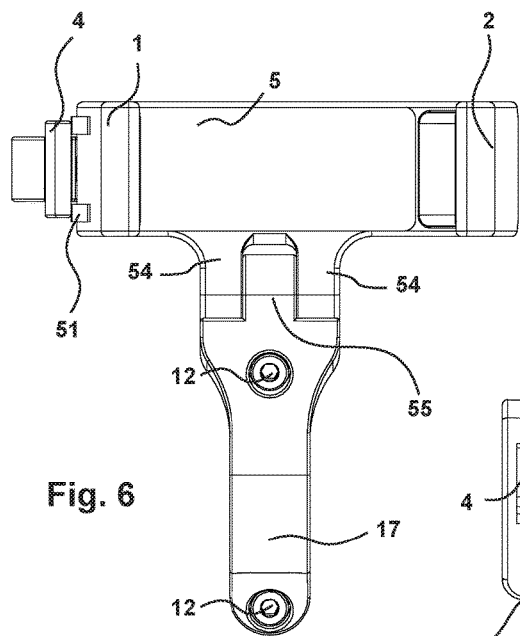
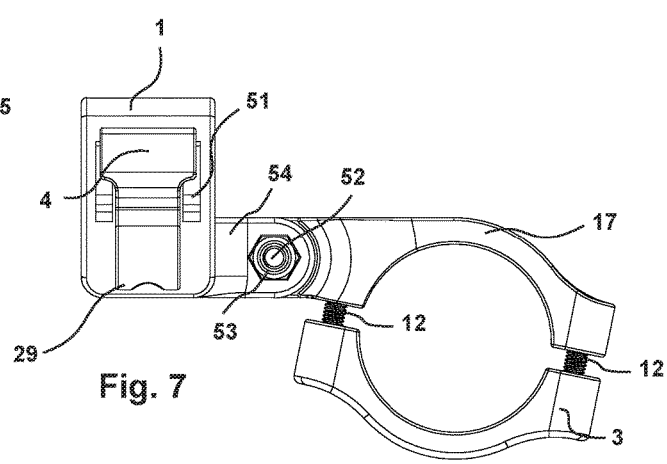

SECTION 9 - 9

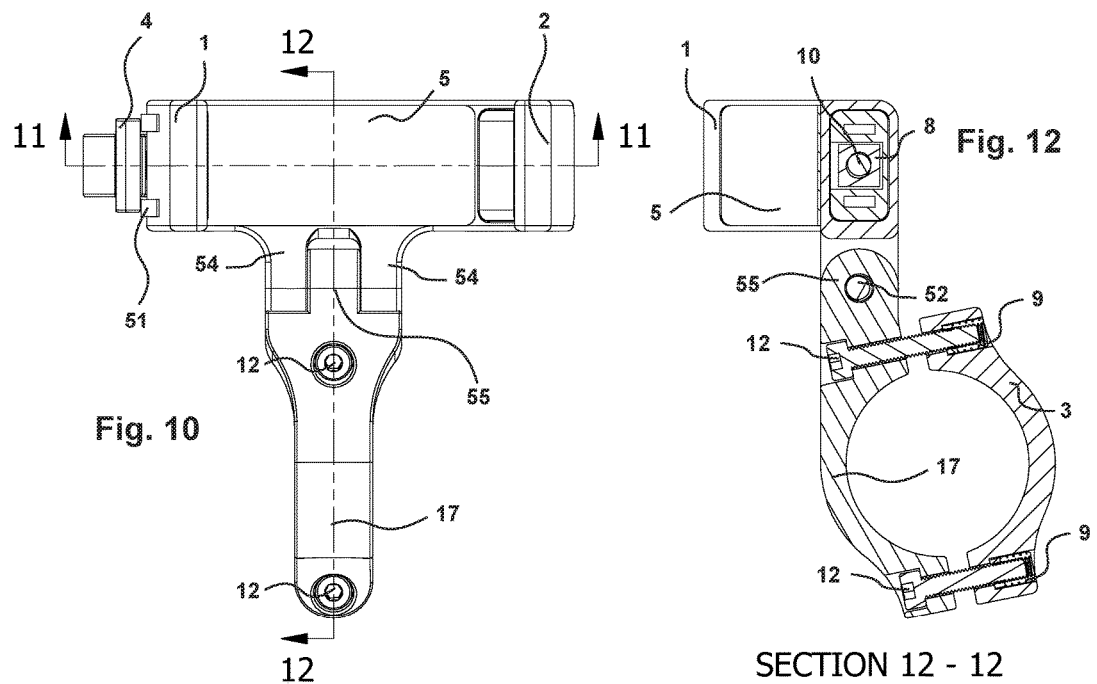
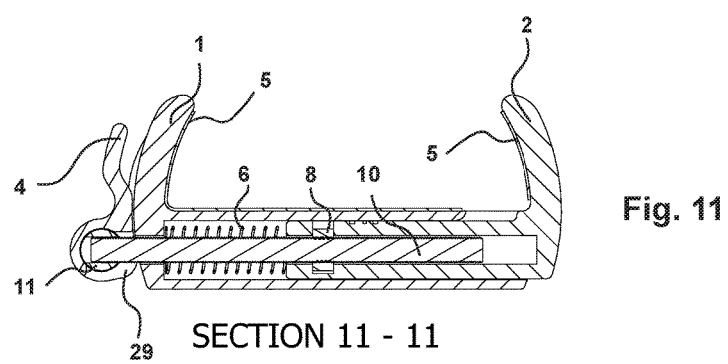

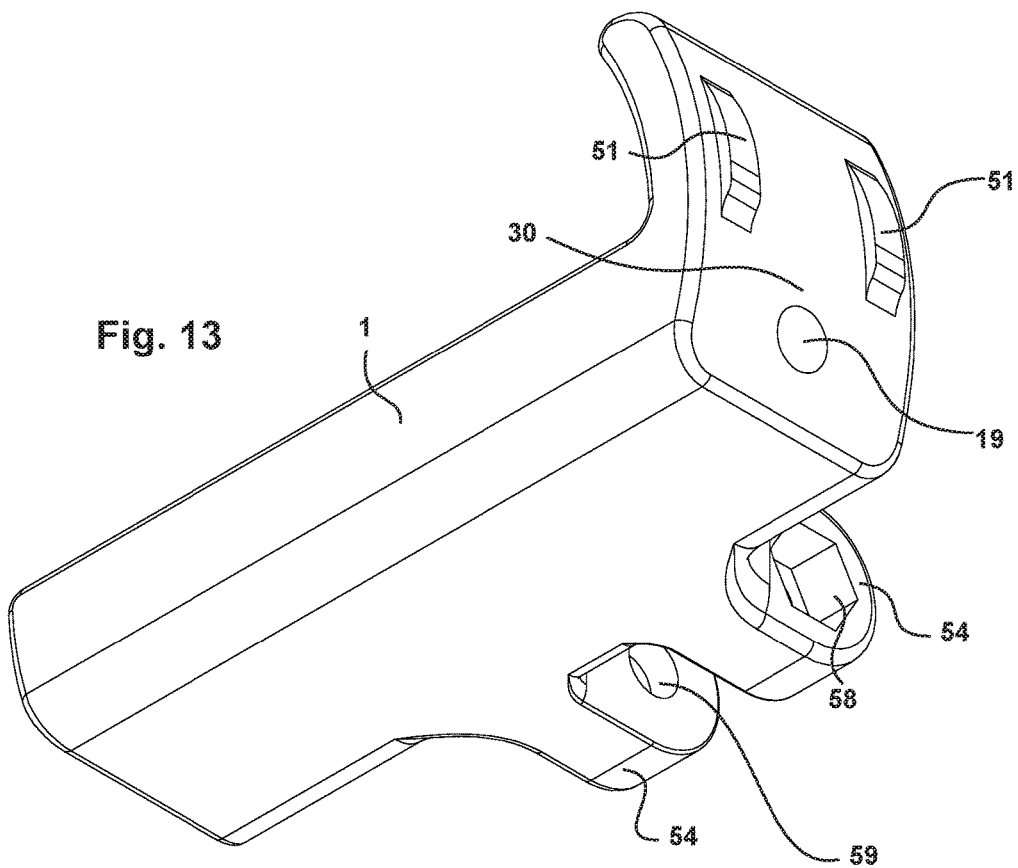

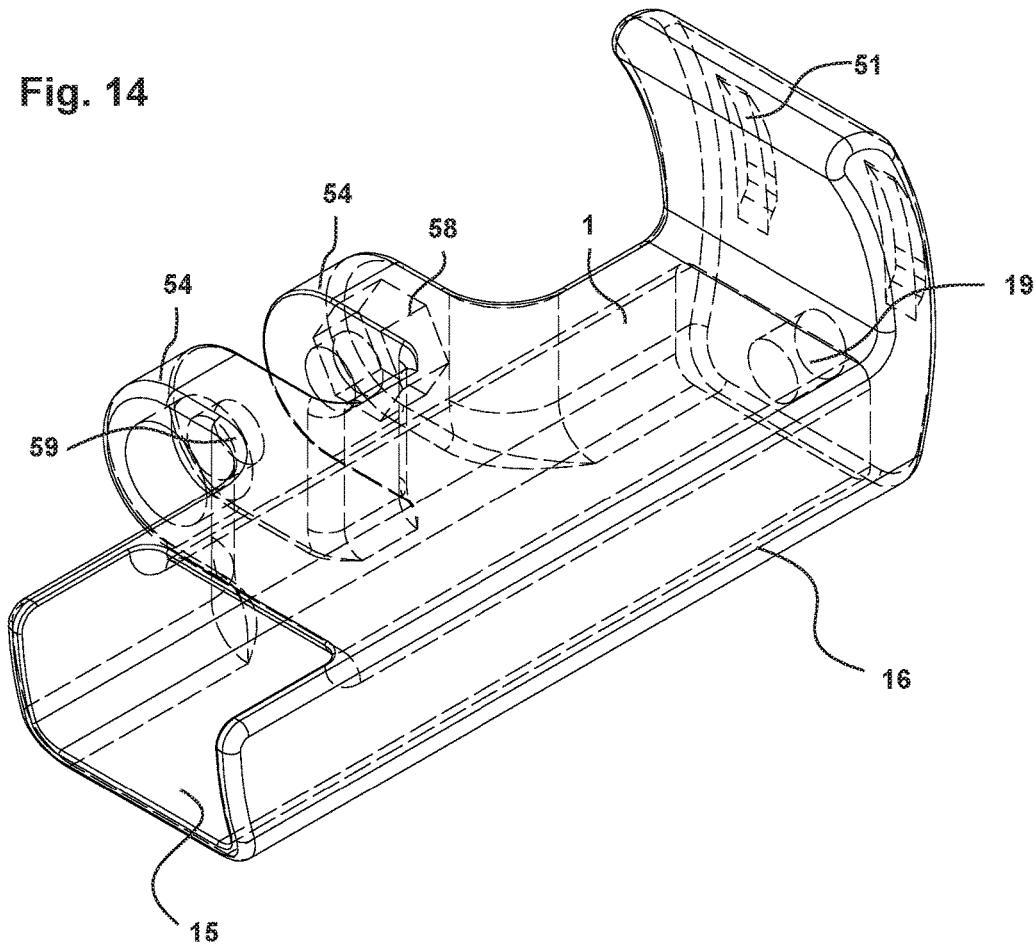

HANDLEBAR ACCESSORY MOUNT

BACKGROUND OF THE INVENTION

1. Field of the Invention

The invention relates to a handlebar accessory mount, and in particular to a device for releasably mounting an accessory to a handlebar. The accessory may be, by way of example and not limitation, a smartphone.

2. Description of Related Art

Arrangements for releasably mounting smartphones and other portable electronic devices, such as trip computers and GPS devices, to the handlebar of a vehicle or apparatus, are currently commercially available. Vehicles with handlebars include bicycles, motorcycles, all-terrain vehicles, all-terrain vehicles, and strollers. Other apparatus that may include a handlebar include treadmills, stationary bicycles, and other exercise machines. By providing a temporary mount for the portable electronic device on the handlebar, the user is able to utilize features of the portable electronic device, such as audio or audiovisual entertainment, communications, and navigation, while leaving the user's hands free to operate or use the device.

An example of such a previously proposed accessory mounting arrangement is disclosed in U.S. Patent Publication No. 2010/0264182. The arrangement disclosed in U.S. Patent Publication No. 2010/0264182 uses a ratchet and pawl arrangement to clamp a portable electronic device within a caddy mountable to a handlebar. Minoura, Ltd. of Japan sells a number of different smartphone mounts that also use a ratcheted side grip rather than an enclosure, while a number of manufacturers including LifeProof and Quad-Lock offer adhesive-based mounting arrangements, in which a mounting piece is adhered to the phone and a complementary mating piece is secured to the handlebar for quick attachment and release. Other known or commercially available arrangements provide smartphone cases adapted to be secured to a particular smartphone mount.

Disadvantages of the conventional mounting arrangements include, in the case of ratchet and pawl arrangements, complexity and relatively high cost, as well as vulnerability to breakage. Disadvantages of adhesive-based or quick-release arrangements, lack of security in that the holder may become disengaged from the handlebar mount due to vibration or sudden movement of the vehicle.

SUMMARY OF THE INVENTION

It is accordingly an objective of the invention to provide a handlebar accessory mounting arrangement for reliably and securely attaching an accessory to a handlebar, and yet that is relatively simple in structure.

This objection is achieved, in accordance with principles of the invention, by a mounting arrangement that utilizes a cam lever operated accessory gripping mechanism to secure the accessory in the mounting arrangement.

In a preferred embodiment of the invention, the gripping mechanism includes a cam lever, a threaded stud, a dowel extending transversely and fixed with respect to a first end of the threaded stud, first and second relatively movable main body sections, and a biasing spring that extends between the first and second main body sections. The first of the main body sections includes a bulkhead with a central opening for slidably receiving the threaded stud, a first clamping jaw for engaging a first side of the accessory, and an opening shaped to slidably receive the second main body section. The second main body section including a bore for receiving the second end of the threaded stud, a slot intersecting the bore and arranged to receive and prevent rotation of an internally threaded fastening member such as a nut, and a second clamping jaw for engaging a second side of the accessory. The threaded stud extends through the opening in the first main body section and the bore in the second main body section, and is threaded into the fastening member to enable adjustment of the relative initial positions of the main body sections in an axial direction. The biasing spring extends, in this embodiment, in a coaxial manner relative to the threaded stud to urge the main body sections in an unclamping direction, such that movement of the cam lever to a clamping position causes the first and second clamping jaws to grip an accessory therebetween against the bias provided by the coil spring, thereby allowing the jaws to firmly grip the accessory without causing damage. The first main body section is arranged to removably mount a top piece of a handlebar bracket, although it is also possible to provide a handle bar mounting top piece that is integral with or permanently fixed to the first clamping member.

In the preferred embodiment of the invention, the dowel is inserted into openings in flanges extending from the camming lever, the flanges each having a overcenter camming surface that engages a cam-engaging surface of the bulkhead on two sides of the stud-receiving central opening in the first main body section, such that pivoting of the camming lever about the dowel in a first direction causes the dowel holding section of the camming level to move in an axial direction of the threaded stud, causing the second main body section and the second clamping jaw to move towards the first clamping jaw and thereby grip the accessory. The camming surface of the camming lever, and/or the cam-engaging surface of the bulkhead, preferably is shaped such that continued turning after a maximum clamping force has been achieved will provides an overcenter latching effect that prevents release of the camming lever to secure the clamping jaws in the gripping position. Release of the accessory can be achieved by pivoting the camming lever in the opposite direction past the point of maximum clamping force to cause the respective clamping jaws on the first and second main body sections to move apart from each other.

The spring bias in a direction opposite the clamping direction enables continued movement of the camming lever to and past the overcenter position and also exerts a force that resists pivoting of the camming lever in a release direction to thereby implement the overcenter latching effect after the clamping jaws have engaged the accessory and can no longer be moved towards each other. In addition, unintentional release of the accessory may be further positively prevented by optional detents or protrusions extending from the cam-engaging surface of the first main body section, in order to increase the force necessary to pivot the camming lever in the release direction. Adjustment of the gripping mechanism to fit different accessories is accomplished by turning the threaded stud to cause axial movement of the threaded stud relative to a fastening member that has been inserted into the corresponding slot in the second main body section to adjust the maximum initial separation between the first and second main body sections and therefore the initial spacing of the first and second clamping jaws.

Additional features of the gripping mechanism include resilient grips made of a material such as rubber and adhered to each of the clamping jaws. The resilient grips provide a tolerance in the clamping operation that ensures a tight grip without damaging the accessory.

The handlebar bracket extension of the first main body section preferably includes a pair of fastener receiving holes and is arranged to be mated to a handlebar clamping piece having a corresponding pair of fastener receiving holes. The handlebar bracket extension and clamping piece may be secured to the handlebar bracket extension by appropriate fasteners such as threaded bolts and inserts or nuts. Alternatively, the handlebar clamping piece may be permanently or movably coupled to the handlebar bracket extension by a hinge mechanism at one end, and clamped to the handlebar by a fastener or fastening mechanism as a second end.

The handlebar accessory mounting arrangement of the preferred embodiment is especially adapted to mount a cellular communications device such as an iPhone™ or Android™ type smartphone to the handlebars of a bicycle. However, it is intended that the invention not be limited to smartphones. By varying the shape or dimensions of the clamping jaws or first and second main body sections of the gripping mechanism, the mounting arrangement of the preferred embodiment may be adapted to accommodate devices other than smartphones, including GPS devices, trip computers, video capture devices, audio players, and other portable electronic devices. In addition, the handlebar bracket may be varied to clamp handlebars other than bicycle handlebars, including by way of example and not limitation, motorcycle or scooter handlebars, a stroller handle, and so forth.

These and other features of the invention will become apparent based on the accompanying drawings and detailed description presented below.

BRIEF DESCRIPTION OF THE DRAWINGS

FIG. 3 is a bottom view of the handlebar accessory mount of FIG. 1.

FIG. 4 is an isometric view of the handlebar accessory mount of FIG. 1, taken from a rear/side perspective.

FIG. 5 is a rear view of the handlebar accessory mount of FIG. 1.

FIG. 6 is a top view of the handlebar accessory mount of FIG. 1.

FIG. 7 is a side view of the handlebar accessory mount of FIG. 1.

FIG. 10 is a top view of the handlebar accessory mount of FIG. 1 taken from the same perspective as FIG. 6 but with added depictions, in dashed line, of interior features.

FIG. 11 is a cross-sectional rear view taken along line 11-11 of FIG. 10.

FIG. 12 is a cross-sectional side view taken along line 12-12 of FIG. 10.

FIG. 13 is a perspective view showing the front, side, and bottom of a first main body section of the handlebar accessory mount of FIG. 1.

FIG. 14 is a perspective view showing the front, side and top of the first main body section of the handlebar accessory mount of FIG. 1, with added depictions, in dashed line, of interior features.

DETAILED DESCRIPTION OF THE PREFERRED EMBODIMENTS

Throughout the following description and drawings, like reference numbers/characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

Figure 16:
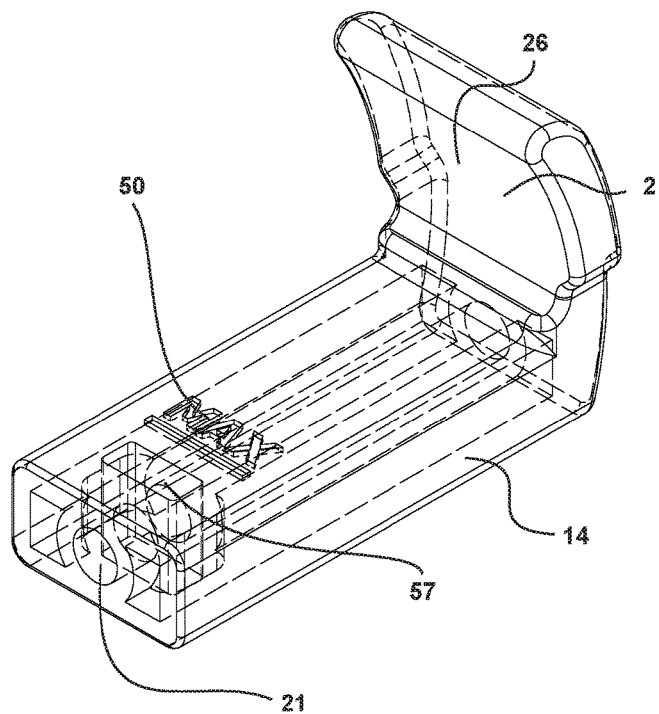
FIG. 16 is a perspective view showing the front, side and top of the second main body section of the handlebar accessory mount of FIG. 1, with added depictions, in dashed line, of interior features.
Figure 15:
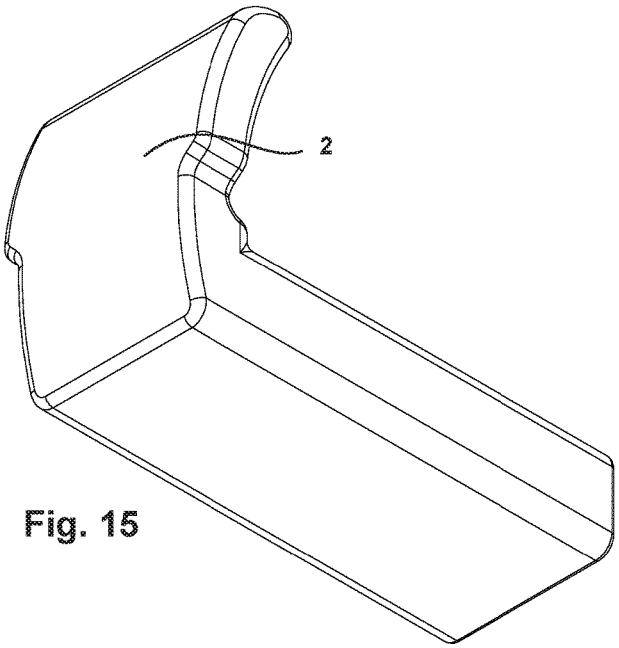
FIG. 15 is a perspective view showing the rear, side, and bottom of a second main body section of the handlebar accessory mount of FIG. 1.

As shown in FIGS. 1-19, a gripping mechanism according to a preferred embodiment of the invention includes a first main body section 1 and a second main body section 2, a cam lever 4, a threaded stud 10, and a dowel 11 secured to a first end 13 of the threaded stud 10 by a fastener such as a hex socket head cap screw or with the use of adhesive in opening 40. The second main body section 2, best shown in FIGS. 16 and 17, includes a slider 14 arranged to be slidably received in a corresponding opening 15 of a chassis of 16 of the first main body section 1 (see FIG. 14).

Figure 17:
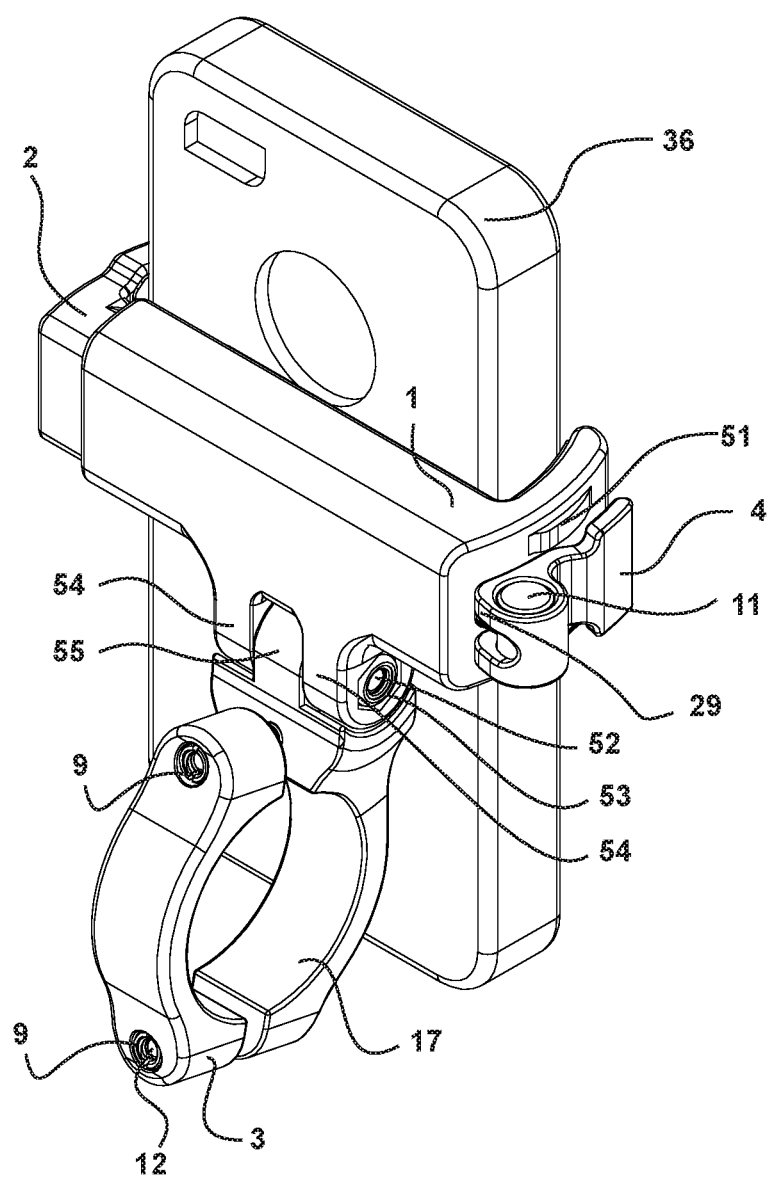
FIG. 17 is an isometric view, take from a lower front side, of the handlebar accessory mount of FIG. 1, in which a smartphone has been mounted.
Figure 18:
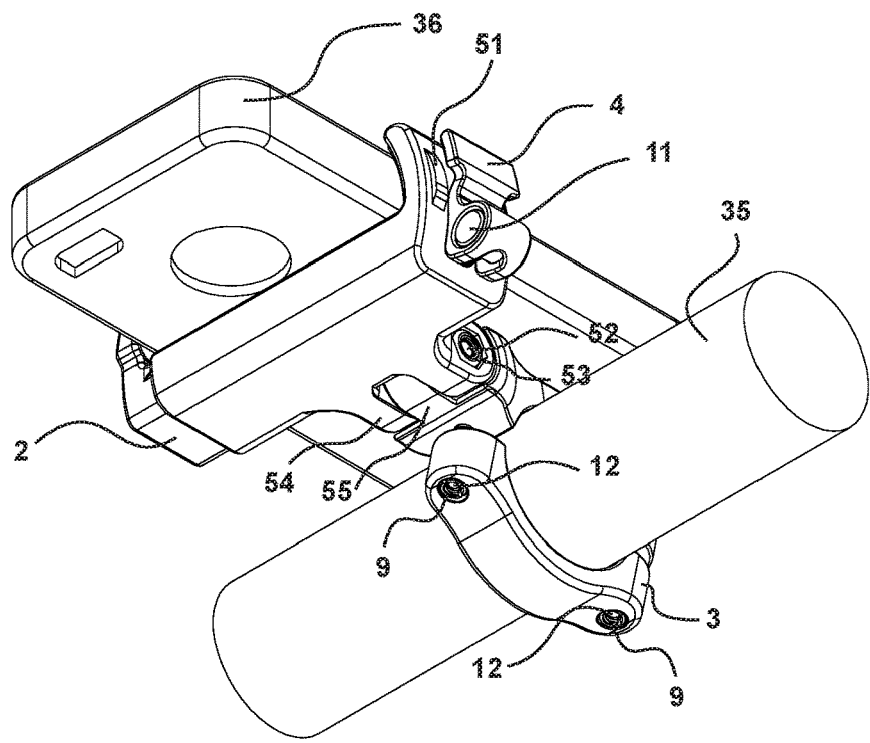
FIGS. 18 and 19 are isometric views of a bicycle handlebar assembly to which the handlebar accessory mount of FIG. 1 has been installed, and in which a smartphone has been mounted.
Figure 19:
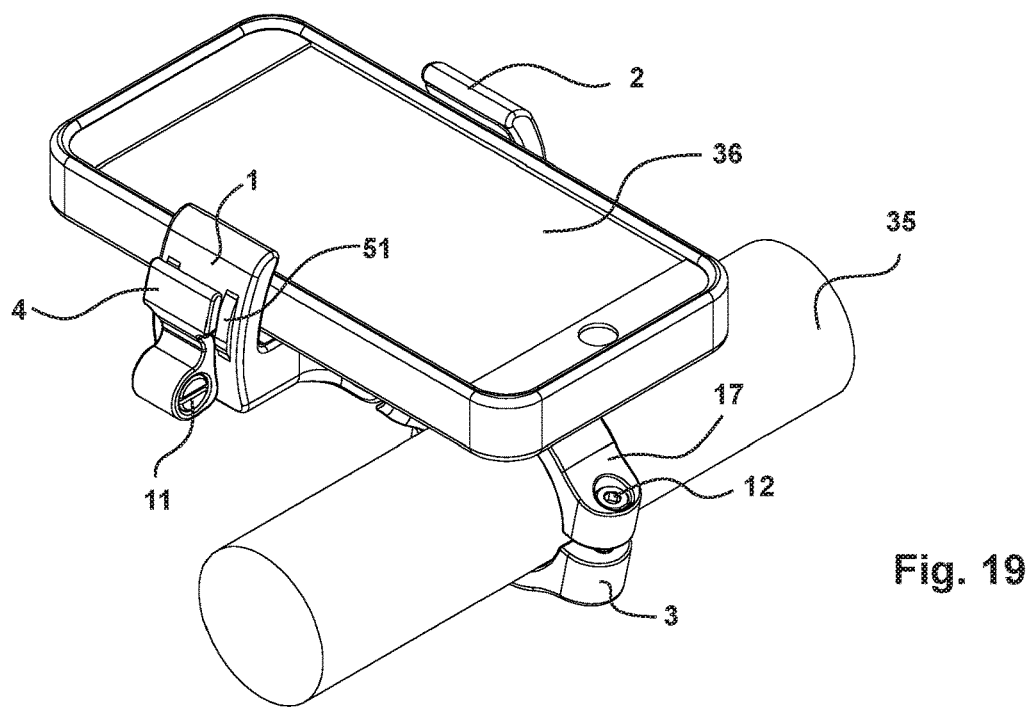

The first main body section, as best shown in FIGS. 13 and 14, further includes laterally extending arms 54 for receiving a corresponding arm 55 of a handlebar mounting top piece 17, a central opening 19 for slidably receiving the threaded stud 10, and a first clamping jaw 20 for engaging a first side of an accessory 36 (illustrated by way of example in FIGS. 17-19 as a smartphone). The arm 55 of the handlebar mounting top piece 17 includes an opening 56 that aligns with a corresponding opening 59 in one of the arms 54 of the first main body section to receive a socket cap screw 52 for securing the top piece 17 to the first main body section upon threading of the screw 52 into a locking hex nut 53 receiving in a correspondingly shaped opening 58 in the second of the arms 54. Although illustrated as a separate piece secured by a screw and nut, the handlebar mounting top piece may alternatively be integral with the main body section 1, or secured by means other than a screw and hex nut, including fastening arrangements that do not require arms extending from either the main body section or the top piece 17.

The slider 14 of the second main body section 2 includes a second clamping jaw 26 for engaging a second side of the accessory 36, a bore 21 for slidably receiving the second end 23 of the threaded stud 10, and a slot 57 that intersects the bore 21 and is shaped to receive and prevent rotation of a fastening member 8, illustrated as a threaded square nut. The second end of stud 10 is threaded into the fastening member 8 to adjust the relative positions of the first and second main body sections by rotating the threaded stud 10 relative to the fastening member 8, as described below. Those skilled in the art will appreciate that while the threaded stud 10 is illustrated as being threaded along its entire length, the threads may be limited to the second end 23, and in particular to the portion of second end 23 that is threaded into the fastening member 8. In addition, the fastening member 8 is not limited to a threaded square nut, but may include a variety of different threaded fasteners, including inserts that fit axially into the bore 21, as opposed to being inserted via a bore-intersecting slot 57.

Figure 1:
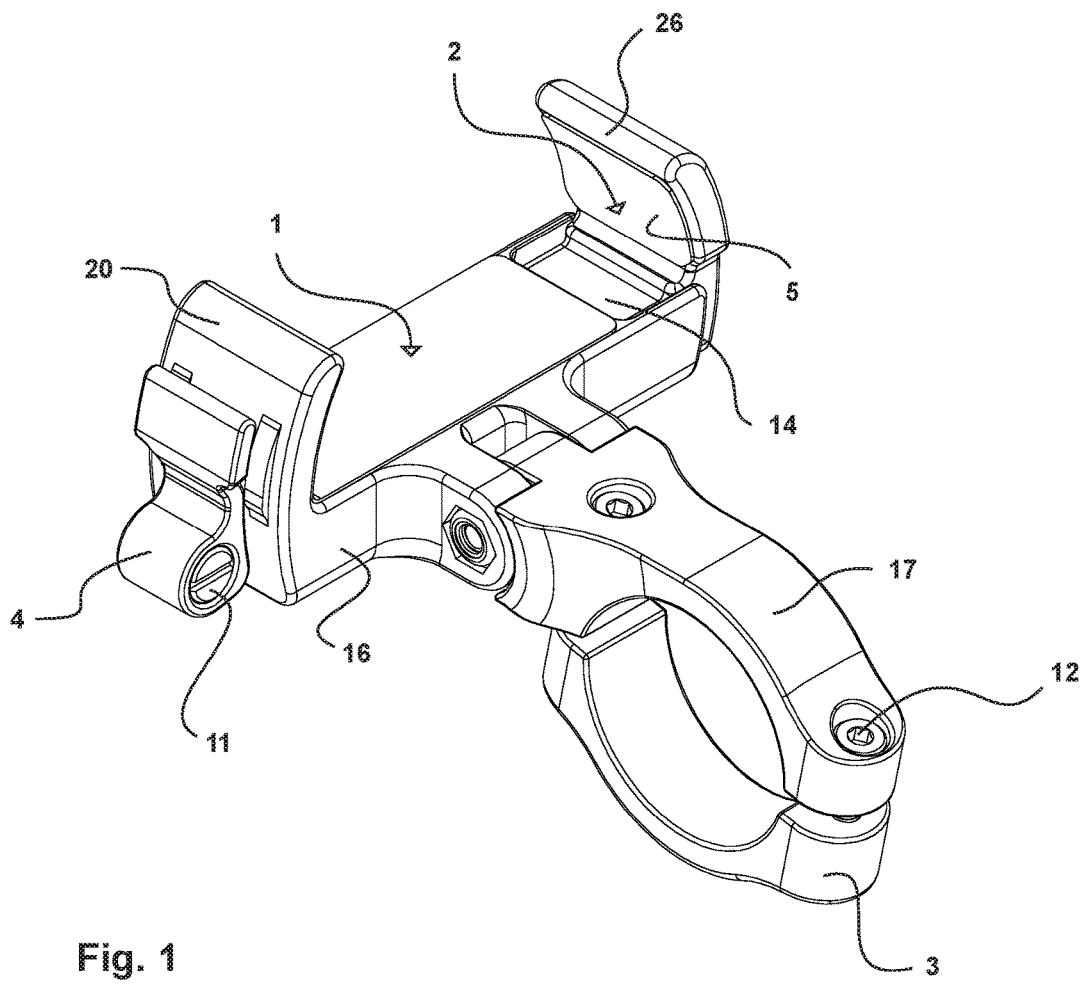
FIG. 1 is an isometric view taken from above and showing a front and side of a handlebar accessory mount constructed in accordance with the principles of a preferred embodiment of the invention.
Figure 2:
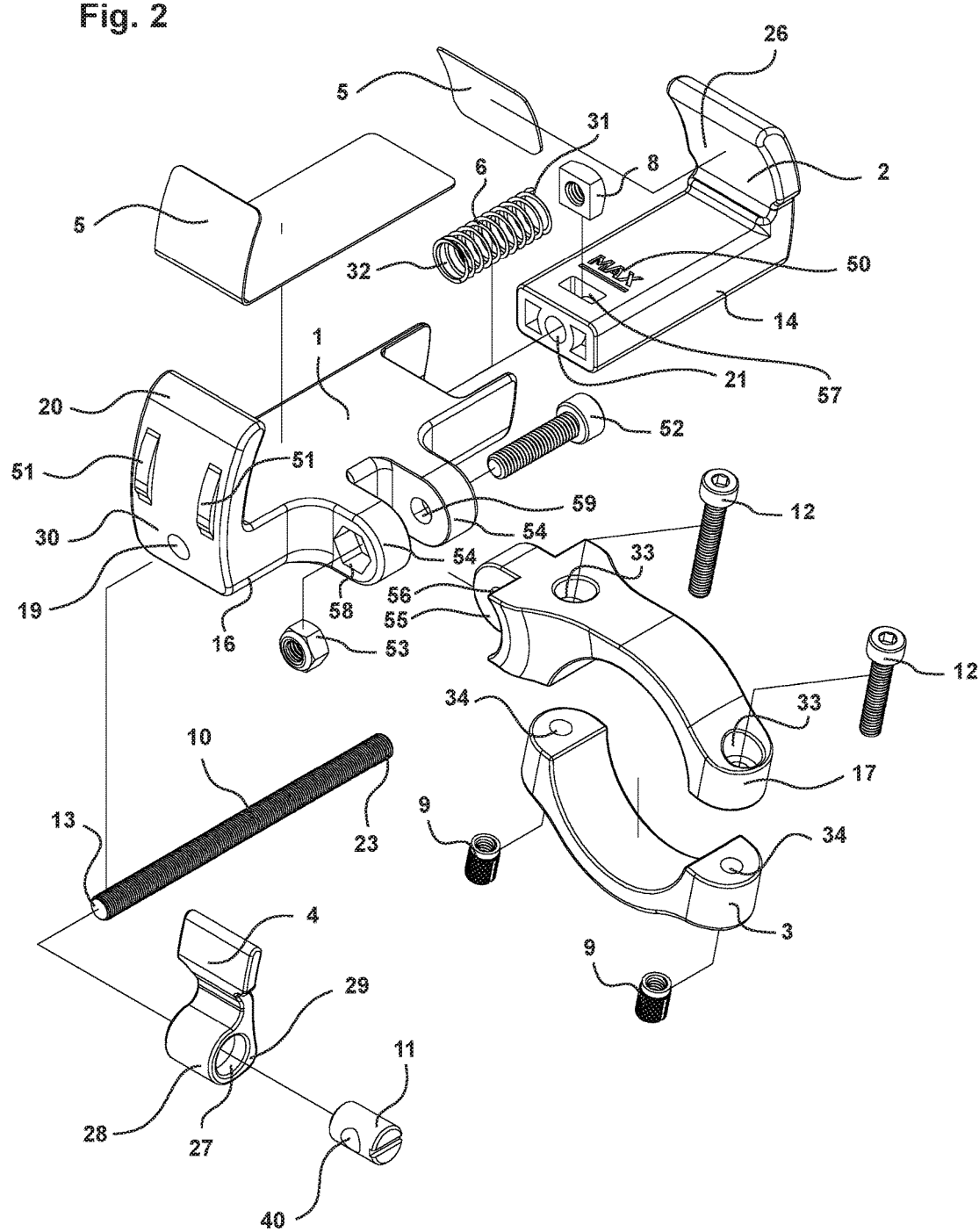
FIG. 2 is an exploded view of the handlebar accessory mount of FIG. 1.
Figure 8:
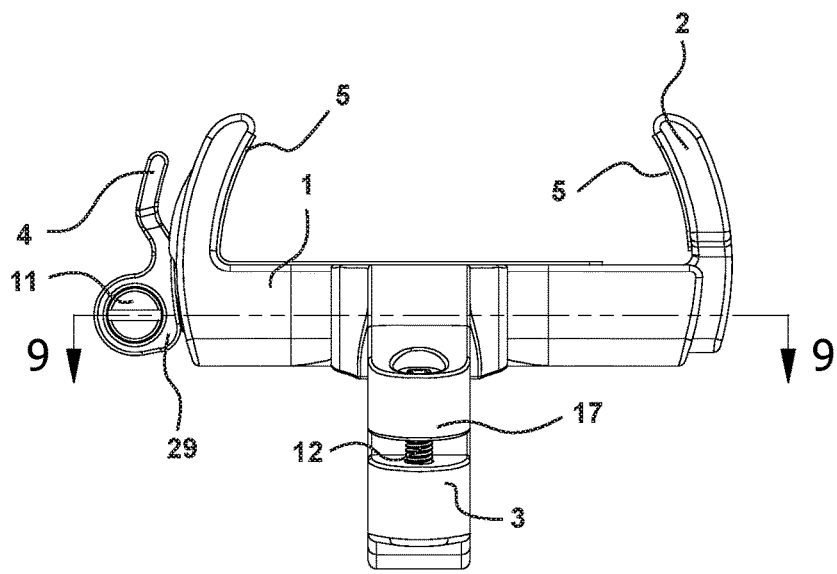
FIG. 8 is a rear view of the handlebar accessory mount of FIG. 1 taken from the same perspective as FIG. 5 but with added depictions, in dashed line, of interior features.
Figure 9:
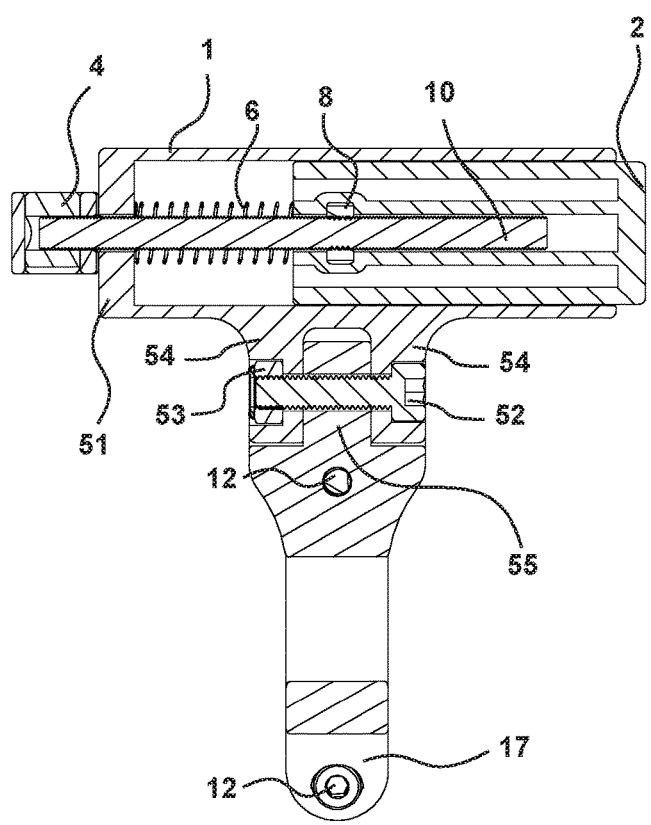
FIG. 9 is a cross-sectional top view of the handlebar accessory mount of FIG. 1 taken along line 9-9 of FIG. 8.

A biasing spring 6 is situated between the first main body section 1 and the second main body section 2, with one end 32 arranged to engage a surface of the first main body section 1 and a second end 32 arranged to engage a surface of the second main body section 2, as illustrated in FIGS. 9 and 11, to bias the two main body section away from each other in an unclamping direction. The biasing spring 6 extends in a coaxial manner relative to the threaded stud 10, such that movement of the cam lever 4 to a clamping position causes the first and second clamping jaws 20 and 26 to grip an accessory therebetween against the bias provided by the coil spring, thereby allowing the jaws to firmly grip the accessory without causing damage. The spring bias in a direction opposite the clamping direction enables continued movement of the camming lever to and past an overcenter position, as described in more detail below, and also exerts a force that resists pivoting of the camming lever in a release direction to thereby implement the overcenter latching effect after the clamping jaws have engaged the accessory and can no longer be moved towards each other.

Each of the first and second main body sections 1,2, the clamping piece 3, and the cam lever 4 may be made of a plastic material, for example by injection molding, CNC machining, or 3D printing/additive manufacturing, while the threaded stud 10, dowel 11, and follower insert 8 may be made of a metal such as brass. However, the various parts of the preferred embodiment described herein are not limited to particular materials or methods of manufacture.

The slider 14 extending axially from the second main body section 2 and the corresponding opening 15 in the first main body section 1 are illustrated as having complementary generally parallelepiped shapes, so that the slider 14 fits within and is axially movable relative to the opening 15, but with an asymmetric feature to ensure that first and second main body sections 1 and 2 are mated with a proper orientation in which the clamping jaws 20 and 26 extend in the same direction. It will be appreciated that the shapes of the slider 14 and opening 15 may be varied in numerous ways without departing from the scope of the invention so long as the shapes permit movement of the clamping jaws 20 and 26 towards and way from each other. In addition, the slider 14 may alternatively be provided, with appropriate modifications, on the first main body section rather than the second main body section, with the opening being provided in the second main body section. The specific shapes of other illustrated parts of the gripping mechanism may also be varied without departing from the scope of the invention.

In the illustrated embodiment, the dowel 11 is inserted into openings 27 in flanges 28 extending from the camming lever 4 (see FIG. 3). Each of the flanges 28 has an overcenter camming surface 29 that engages a cam-engaging surface 30 of the first main body section 1 on two sides of the stud-receiving central opening 19. The first end 13 of the threaded stud 10 is fixed to the dowel 11 by a screw or with the use of adhesive in opening 40, which extends diametrically through a center of the dowel midway between the two ends, such that the threaded stud 10 moves axially with axial movement of the camming lever 4, but can be rotated by rotating the cam lever 4 to enable adjustment of the relative positions of the first and second main body sections 1,2 as the slider 14 of the second main body section 2 moves axially in response to engagement of the threaded second end 23 with the threads of fastening member 8.

To prevent a user from unintentionally rotating the threaded stud 10 far enough to disengage from the fastening member 8, an optional marker 50 may be provided to indicate maximum separation of the main body sections. The marker 50 may be positioned to align with an end surface of the first main body section 1.

The camming surfaces 29 of the flanges 28 that form the dowel holding section of the camming lever 4 are shaped such that pivoting of the camming lever 4 about the dowel 11 in a first direction causes the flanges 28 to move in an axial direction relative to the threaded stud 10, pulling the second main body section 2 in a direction that causes the second clamping jaw 26 to move towards the first clamping jaw 20 and thereby grip the accessory 36. The camming surface 29 is preferably also shaped such that continued turning of the cam lever 4, after the clamping jaws 20 and 26 have engaged respective sides of the accessory and a maximum clamping force has been achieved, will provide an overcenter latching effect that prevents unintended movement of the cam lever 4 in the release direction and thereby permits a slight movement of the threaded stud 10 in a direction opposite the clamping direction to prevent release of the cam lever 4 and secure the clamping jaws 20 and 26 in the gripping position. In addition, unintentional release of the accessory may be further positively prevented by optional detents or protrusions 51 extending from the cam-engaging surface 30 of the first main body section 1, in order to increase the force necessary to pivot the camming lever in the release direction. Release of the accessory 36 can be achieved by pivoting the cam lever 4 in a direction opposite the first direction, past the point at which the clamping jaws 20 and 26 begin to move away from each and disengage from the accessory 36.

The spring bias provided by bias spring 6 in the direction opposite the clamping direction of the first and second main body sections 1 and 2 enables continued movement of the camming lever to and past the overcenter position after the clamping jaws 20 and 26 have engaged the accessory 36. Although illustrated as a coil spring that is coaxial with the threaded stud 10, it will be appreciated that a spring bias may alternatively be achieved by utilizing resilient members other than the illustrated coil spring, such as by including multiple coil springs extending in parallel to the threaded stud and seated in boards provided in one or both of the main body sections.

Additional features of the gripping mechanism include resilient grips 5, which may be made of rectangular sheets of a material such as rubber, and which are provided in each of the clamping jaws 20 and 26 to provide a tolerance in the clamping operation that ensures a tight grip without damaging the accessory, and also optionally along a principle surface of the main body section 1 to provide additional cushioning for the accessory. To further secure the accessory 36, the clamping jaws 20 and 26 are illustrated as having concave gripping surfaces, although the illustrated shapes and configuration of the clamping jaws may be varied depending on the shape of the accessory to be clamped.

The handlebar mounting top piece 17, which is arranged to be mounted to the first main body section 1 as described above, includes a pair of fastener receiving holes 33 and is arranged to be mated to the handlebar clamping bottom piece 3 secured to the handlebar mounting top piece 17 by appropriate fasteners such as threaded bolts 12 and internally threaded inserts or nuts 9 extending through holes 34. The extension 17 and clamping piece 3 including inwardly extending arc shaped surfaces that form a circular opening having a diameter corresponding to that of a bicycle handlebar 35, shown in FIG. 20, in order to accommodate the handlebar when the clamping bottom piece 3 is fastened to the top piece 17. It will be appreciated by those skilled in the art that the top piece 17, bottom piece 3, bolts 12, and inserts 9 may be modified to fit different handlebars, or replaced by a different clamping arrangement, without departing from the scope of the invention.

The handlebar accessory mounting arrangement of the preferred embodiment is especially adapted to mount a cellular communications device such as an iPhone™ or Android™ type smartphone to the handlebars of a bicycle. However, it is intended that the invention not be limited to smartphones. By varying the shape or dimensions of the clamping jaws or first and second main body sections of the gripping mechanism, the mounting arrangement of the preferred embodiment may be adapted to accommodate devices other than smartphones, including GPS devices, trip computers, video capture devices, audio players, and other portable electronic devices. In addition, the handlebar bracket may be varied to clamp handlebars other than bicycle handlebars, including by way of example and not limitation, motorcycle or scooter handlebars, a stroller handle, and so forth.

What is claimed is:

1. A cam lever operated accessory gripping mechanism to secure an accessory to a handlebar, comprising:
    a cam lever;
    a threaded stud;
    a dowel to which a first end of the threaded stud is fixed;
    a first main body section;
    a second main body section; and
    at least one biasing spring extending between the first main body section and the second main body section,
    wherein the first main body section is arranged to be clamped to the handlebar and includes an opening for slidably receiving the threaded stud; a first clamping jaw for engaging a first side of the accessory, and an opening shaped to slidably receive a second main body section,
    wherein the second main body section includes a bore for slidably receiving a second end of the threaded stud and a second clamping jaw for engaging a second side of the accessory, and is arranged to support a fastening member into which the second end of the threaded stud is threaded,
    wherein the dowel is inserted into openings in the cam lever the cam lever having at least one overcenter camming surface that engages a cam-engaging surface of the first main body section, such that pivoting of the camming lever about the dowel in a first direction causes the dowel holding section of the camming level to move in an axial direction of the threaded stud, pulling the second main body section in a direction that causes the second clamping jaw to move towards the first clamping jaw and thereby grip the accessory,
    wherein the at least one overcenter camming surface of the cam lever and/or the cam-engaging surface of the first main body section are shaped such that continued turning after a maximum clamping force has been achieved provides an overcenter latching effect that permits a slight movement of the threaded stud in a direction opposite the clamping direction to prevent release of the camming lever and thereby secure the clamping jaws in the gripping position,
    wherein adjustment of the gripping mechanism to fit different accessories is accomplished by turning the camming lever about an axis of the threaded stud, to cause rotation of the threaded stud with respect to the fastening member and axial movement of the second main body section in a desired direction to adjust the initial spacing of the first and second clamping jaws, and
    wherein the accessory is released by pivoting the camming lever in a releasing direction opposite the first direction past the point of maximum clamping force to cause the clamping jaws to move apart.

2. A cam lever operated accessory gripping mechanism as claimed in claim 1, wherein the cam lever includes a pair of flanges each having one said overcenter camming surface engaging the cam-engaging surface on opposites sides of the stud-receiving opening in the first main body section, each said flange further including an opening for rotatably receiving a respective end of the dowel.

3. A cam lever operated accessory gripping mechanism as claimed in claim 2, wherein the threaded stud extends transversely to the dowel and is fixedly secured to the dowel at a point midway between the ends of the dowel.

4. A cam lever operated accessory gripping mechanism as claimed in claim 2, wherein the cam-engaging surface further includes detents for resisting pivoting of the camming level in the releasing direction.

5. A cam lever operated accessory gripping mechanism as claimed in claim 1, further comprising at least one bias spring for providing a spring bias in a direction opposite the clamping direction to enable continued movement of the camming lever to and past the overcenter position after the clamping jaws have engaged the accessory.

6. A cam lever operated accessory gripping mechanism as claimed in claim 5, wherein the at least one bias spring is a coil spring that extends coaxially with respect to the threaded stud and includes first and second ends that respective engage the first and second main body sections.

7. A cam lever operated accessory gripping mechanism as claimed in claim 1, further comprising resilient grips on each of the clamping jaws to provide a tolerance in the clamping operation that ensures a tight grip without damaging the accessory.

8. A cam lever operated accessory gripping mechanism as claimed in claim 7, wherein the resilient grips are made of rubber.

9. A cam lever operated accessory gripping mechanism as claimed in claim 1, wherein the first main body section is arranged to be clamped to the handlebar by a handlebar mounting top piece bolted to the main body section.

10. A cam lever operated accessory gripping mechanism as claimed in claim 9, wherein the main body section includes a pair of laterally extending arms and the handlebar mounting top piece is secured to the pair of laterally extending arms by a fastening nut and a bolt that extends through aligned openings in the arms and the handlebar mounting top piece.

11. A cam lever operated accessory gripping mechanism as claimed in claim 1, wherein the fastening member is a nut threaded onto the second end of the threaded stud.

12. A cam lever operated accessory gripping mechanism as claimed in claim 11, wherein the nut is received in a slot in the second main body section that intersects the threaded-stud-receiving bore and is shaped to prevent rotation of the nut.

13. A cam lever operated accessory gripping mechanism as claimed in claim 1, further including a maximum spacing marker to indicate a maximum spacing of the clamping jaws and prevent unintentional disengagement of the first and second main body sections during rotation of the threaded stud to adjust the spacing.

14. A cam lever operated accessory gripping mechanism as claimed in claim 1, wherein the accessory is at least one of a cellular communications device, a GPS device, trip computer, video capture device, and audio player.

15. A cam lever operated accessory gripping mechanism as claimed in claim 1, wherein the handlebar is a handlebar of a bicycle.

\* \* \* \* \*